Nov. 12, 1929.   P. SUPERVIELLE   1,735,143
SANITARY DRINK MIXER
Filed Aug. 11, 1926   2 Sheets-Sheet 2

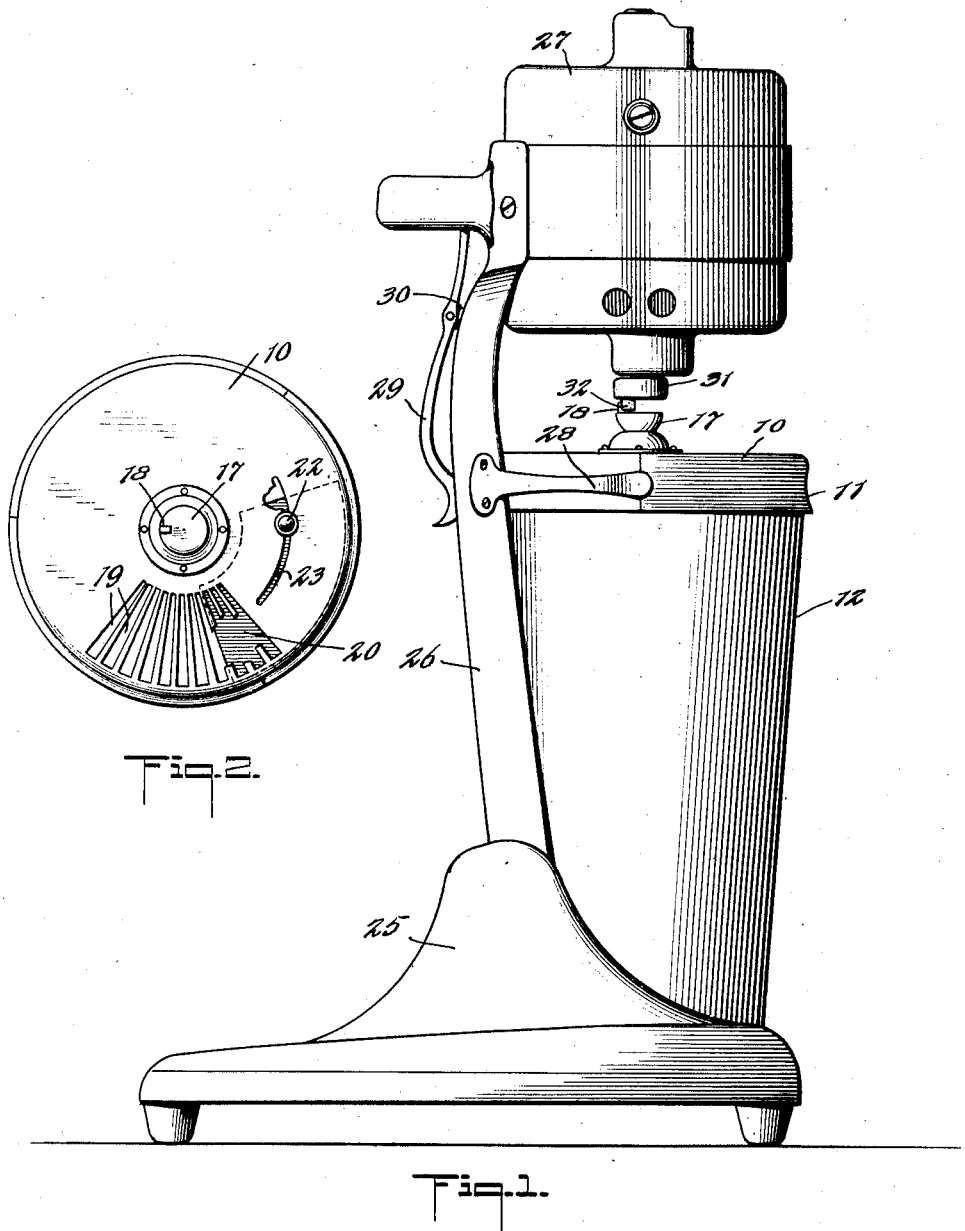

INVENTOR
Pablo Supervielle
by his attorneys
Howson and Howson

Patented Nov. 12, 1929

1,735,143

UNITED STATES PATENT OFFICE

PABLO SUPERVIELLE, OF HABANA, CUBA

SANITARY DRINK MIXER

Application filed August 11, 1926. Serial No. 128,609.

This invention relates to sanitary drink mixers of the type in which a vertical agitator is rotated by a small motor, and more particularly to means for protecting the contents of the container.

Among the objects of the invention may be mentioned the provision of a mixer which will operate in accordance with the rules of hygiene, and wherein the contents are afforded complete protection from the moment at which they have been poured into the mixer until they are poured out.

A preferred form of the invention is illustrated in the accompanying drawings, in which Figure 1 is a side elevation of a complete mixer in which the present invention is embodied;

Fig. 2 is a plan view of the removable top, used with the container;

Figure 3:
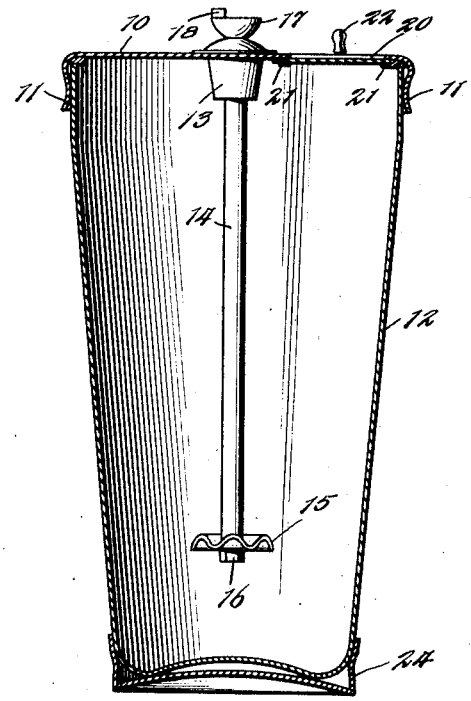
Fig. 3 is a vertical section of the container including the removable top and agitator journalled therein.

In automatic drink mixers it is customary to attach an agitator to actuating means such as a small motor and the common axis of the motor and agitator being vertical, to stir the drink by the rotation of the agitator. Where flies, other insects and dirt are likely to be present, the mixing of drinks is frequently an unsanitary process because such foreign elements are apt to enter the open container from the top, or to lie upon and adhere to the unprotected agitator when not in use.

In the present novel construction these undesirable contingencies are provided against by covering the container completely, from the time the ingredients of the drink are poured into it, until the mixed drink is poured out. For this purpose a special cover is provided in which the agitator shaft is journalled as hereinafter described. Means connected with the agitator external to the cover permit engagement with the motor shaft. The container, cover and agitator thus form a detachable unit which is easily handled. I also prefer to include as a unitary part of the cover a closable strainer adapted to permit pouring without removal of the cover.

Referring to the accompanying drawings, it will be observed that the cover 10 has a flange 11 which fits tightly over the top edges of the container 12, making the container substantially air-tight. In the center of the cover is a sealed bearing 13 in which the agitator shaft 14 is journalled. The agitator extends through the cover 10. At the lower end of the agitator shaft is the propeller 15 rigidly attached to the shaft by a nut 16. On the upper end of the agitator shaft is attached a bushing 17 of considerably greater diameter than that of the shaft, and upon the outer face of this bushing is an eccentrically mounted dog 18, the purpose of which will be described hereinafter. Thus a single lug is provided upon the upper end of the agitator spaced from its axis of rotation.

There may be slots or holes 19 in the cover 10, so located as to form a strainer. In the drawings these slots are shown arranged radially. For the purpose of opening or closing these slots a plate 20 is slidably held tight against the underside of the cover by arcuate angle pieces 21. This plate is positioned beneath the slots and the adjacent surface of the cover. A knob 22 projecting above the cover is attached to this plate, its neck passing through a slot 23 in the cover. It is thus possible by moving the knob 22 to open or close the strainer slots as desired.

Rigidly attached to the base of the container, and surrounding its lower part is a cup 24 which is made of heavier material than the container proper. The purpose of this cup is, by engagement with other parts, to prevent the container from turning during the process of mixing, as will be later explained. The cup also protects the bottom part of the container.

The container unit which has just been described, may be used in connection with a mixing apparatus such as that shown in Figure 1. This comprises a base 25, an upright support 26, and a motor 27, supported upon the upright frame. Also supported by the upright member are a pair of steadying members 28, which bear against the top of the mixer when it is in the operative position. If desired, automatic starting means may also be included in this construction, and such elements are included in Figure 1. A switch lever 29 is pivoted to a lug 30 on the frame 26. The lower end of this lever is adapted to be pushed outwardly as the container is pushed into the mixing position. In other words the switch lever 29 is in a position to be operated by the container when pushed beneath the motor. The upper end of the lever 29 operates a switch (not shown) which starts the motor 27.

The motor used has the usual spindle (here disposed vertically) a bushing 31 bearing a dog or lug 32 upon its lower end at the proper height. The dog 32 is spaced from the spindle's axis of rotation, a distance equal to that of the lug 18 from the axis of rotation of the agitator. The two axes of rotation, of course, coincide when the apparatus is in operation. This dog 32 and the dog 18 on the agitator form means adapted to cause engagement between the agitator and motor. By this engagement of the dog 32 with the dog 18 on the bushing 17 of the agitator shaft the connection between the agitator and the motor is at a point external to the container. By the use of dogs in this way it is possible to make operative engagement by merely pushing the container unit into position against the upright support 26.

Figure 4:
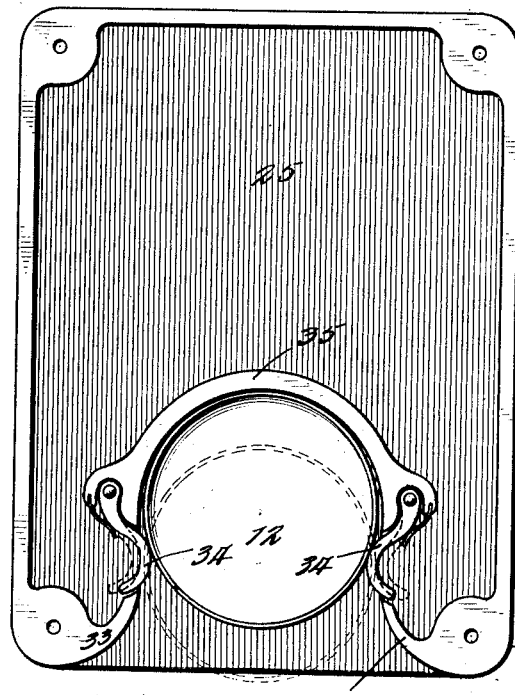
Fig. 4 is a plan view showing the action of the holder which prevents the container from rotating during the mixing operation.

The container is prevented from rotating during mixing by means of the combination of elements shown in Fig. 4 which are located in the base 25. Guide pieces 33 present converging smooth surfaces between which the lower part of the container is guided into engagement with the other elements. A pair of arms 34 are pressed toward each other by springs, and bear against the container when it is pushed between them. An element 35 having an inner surface substantially in the form of a semi-circle, is also provided. In the mixing position the cup 24 surrounding the lower part of the container bears against the semi-circular surface presented by the element 35, and is gripped by the arms 34. The container is thus prevented from turning during the mixing of its contents.

The operation of the mixer is as follows:

The ingredients of the drink to be mixed are poured into the container and thereupon the cover bearing the agitator is pressed tightly upon the top of the container. The strainer is of course closed at this time. The container is now placed in the mixing machine, being slid along the flooring of the base 25 until it is grasped by the holding apparatus illustrated in Fig. 4 and described above, and also by the steadying members 28 at its top. At this point the rear side of the container comes in contact with the automatic starting lever and starts the motor. It will be understood from a consideration of Figure 1 that the container may easily be placed in position without interference with the engaging bushing 31 and dog 32 on the motor, because of the construction which has been described and illustrated. This is an important feature of the invention.

The motor being started by contact with the automatic starting lever, the dog 32 upon the bushing 31 attached to the motor shaft revolves until it engages with the dog 18 on the agitator shaft, and then revolves the agitator shaft. Thus the covered container is adapted to be slid into position beneath the motor by a simple horizontal movement, thereby simultaneously starting said motor and causing said lugs to engage.

It will be observed that during the entire operation the contents of the container are protected from all access to foreign substances or organisms.

When sufficient time has elapsed to complete the mixing of the drink, the container is firmly grasped and removed from the mixing apparatus, the motor being stopped thereby. The cover may now be removed and the contents poured into the serving glass or glasses.

Preferably the strainer is used and it is, of course, unnecessary to remove the cover in order to pour out the contents of the container. The knob 22 is simply pushed in the slot 23, thereby removing the covering plate 20 from the openings 19 of the strainer, and the contents of the container remaining protected may be poured into the receptacle from which they are to be served.

It will be noticed that the simplicity of the construction described permits of easy washing of the agitator, and that the container may without difficulty be kept in clean and sanitary condition.

It will be further evident that by the use of this invention the height of the motor may be considerably reduced, with consequent saving in cost of the apparatus, and increased convenience. Less material is employed in constructing the apparatus. Less space is required. There is less chance of overturning. It is not necessary either to press the motor down when mixing, or to push the container inward and then upward. Operation is thus simplified.

This invention provides a simple and effective means for maintaining beverages while being mixed in an absolutely sanitary condition, and is of particular value where insects, foreign particles and bacteria are likely to come into contact with food or beverages which are being served.

Modification of the apparatus described which do not depart from the scope of my invention will readily occur to those skilled in the art.

I claim:

A drink mixing apparatus comprising a container, a cover for said container, a motor, and a frame supporting said motor, in combination with a rotatable agitator journalled in said cover extending therethrough, a single lug on the upper end of said agitator spaced from its axis of rotation, a vertical spindle in said motor, a single lug at the lower end of said spindle spaced from the axis of rotation, and a switch lever on said frame in a position to be operated by the container when pushed beneath said motor, the covered container being adapted to be slid into position beneath said motor by a simple horizontal movement, thereby simultaneously starting said motor and causing said lugs to engage, substantially as described.

In testimony whereof I have signed my name to this specification.

PABLO SUPERVIELLE.